United States Patent [19]

Spurr

[11] Patent Number: 4,532,274
[45] Date of Patent: Jul. 30, 1985

[54] CURABLE EPOXY RESIN CONTAINING MOLDING COMPOSITIONS

[75] Inventor: Orson K. Spurr, Bridgewater, N.J.

[73] Assignee: Union Carbide Corporation, Danbury, Conn.

[21] Appl. No.: 600,222

[22] Filed: Apr. 17, 1984

Related U.S. Application Data

[63] Continuation of Ser. No. 430,364, Sep. 30, 1982, abandoned.

[51] Int. Cl.$^3$ .............................................. C08L 63/00
[52] U.S. Cl. ...................................... 523/457; 528/93; 528/94; 528/89; 528/110; 528/361; 528/406
[58] Field of Search .................... 523/457; 528/93, 94, 528/89, 110, 406, 361

[56] References Cited

U.S. PATENT DOCUMENTS

| 2,750,395 | 6/1956 | Phillips et al. | 549/547 |
| 2,890,194 | 6/1959 | Phillips et al. | 528/297 |
| 2,890,196 | 6/1959 | Phillips et al. | 528/297 |
| 2,918,444 | 12/1959 | Phillips et al. | 528/365 |
| 2,921,925 | 1/1960 | Phillips et al. | 528/297 |
| 3,169,945 | 2/1965 | Hostettler et al. | 528/354 |
| 3,318,822 | 5/1967 | Batzer et al. | 528/365 |
| 3,562,213 | 2/1971 | Collis | 528/94 |
| 3,677,978 | 7/1972 | Dowbenko et al. | 528/94 |
| 4,042,550 | 8/1977 | Tuller et al. | 523/457 |
| 4,105,667 | 8/1978 | Thom | 528/361 |
| 4,122,067 | 10/1978 | Anderson | 528/89 |
| 4,218,360 | 8/1980 | Burhans et al. | 523/457 |

Primary Examiner—Ronald W. Griffin
Attorney, Agent, or Firm—Steven T. Trinker

[57] ABSTRACT

Described herein are curable molding compositions comprising an epoxide resin, a polyol and particular catalysts. These compositions have good pot life and cure rapidly.

13 Claims, No Drawings

CURABLE EPOXY RESIN CONTAINING MOLDING COMPOSITIONS

This application is a continuation of prior U.S. application Ser. No. 430,364, filed on Sept. 30, 1982, now abandoned.

BACKGROUND OF THE INVENTION

This invention is directed to a curable molding composition comprising an epoxide resin, a polyol, a hardener, and particular catalysts.

Epoxide resins have been used in a variety of applications. Particularly, cycloaliphatic epoxides have inherently good electrical properties. However, formulations containing cycloaliphatic epoxides tend to be too reactive at low temperatures and thus have short pot life. Further, these formulations are not reactive enough at high temperatures and therefore cure too slowly. Curing these formulations faster results in short pot life. Pot life is the time available for use of the epoxy system after the resin and curing agent are mixed.

Therefore, there is a desire to develop epoxide resin containing formulations with rapid cure times, long-pot lives while maintaining the good electrical and mechanical properties that the epoxide resin inherently possesses.

DESCRIPTION OF THE INVENTION

It has now been found that the addition of a select group of catalysts to a curable molding composition comprising an epoxide resin, a polyol, and a hardener results in a composition having long pot life and one which cures rapidly at elevated temperatures. Also, an article molded from such a composition has good electrical and mechanical properties after post cure.

The catalysts which are used in this invention are characterized by the performance of the formulation containing 60 percent by weight of the total formulation of aluminum trihydrate filler in which they are incorporated. The formulation containing the catalyst has a peak exotherm of 210° C. or less, a time to peak exotherm of 10.5 minutes or less in a mold at 150° C., and the time for the viscosity of the formulation to reach 3000 centipoise at 80° C. is 30 minutes or greater or 60 minutes or greater for the formulation to reach a viscosity of 20,000 centipoise at 80° C. The catalysts suitable for use in this invention include one or more amines such as pyridine-N-oxide, 1,4-diazabicyclo [2.2.2] octane, 2-methyl-imidazole, 2-phenyl-imidazole, 1-vinyl-2-methyl imidazole, 1-acetyl imidazole; quaternary ammonium or phosphonium compounds such as n-propyl triphenyl phosphonium bromide, benzyl triphenyl phosphonium bromide and chloride, n-heptyl triphenyl phosphonium bromide, ethyl triphenyl phosphonium bromide and iodide, and n-hexyl triphenyl phosphonium bromide; diamines, such as bis(dimethylaminoethyl) ether, and the like.

These catalysts are used in amounts of from about 0.5 to about 10 parts by weight per 100 parts by weight of resin.

If the catalyst is a solid, it may be dissolved in a suitable solvent such as an alcohol or polyol. These include 2 ethyl 1,3-hexanediol, polycaprolactone polyols, diethylene glycol, triethylene glycol, methyl cellosolve, butyl cellosolve, and the like.

The epoxide resins suitable for use herein contain more than one 1,2-epoxide group per average molecule. The cycloaliphatic epoxides are preferred.

Suitable cycloaliphatic epoxides for purposes of this invention are those having an average of more than one vicinal epoxy group per molecule. The epoxy groups can be terminal epoxy groups or internal epoxy groups as exemplified by the cycloaliphatic epoxides which are subsequently described. Particularly desirable cycloaliphatic epoxides are the cyclohexane diepoxides, that is epoxies having at least one cyclohexane ring to which is attached at least one vicinal epoxy group.

Illustrative of suitable cycloaliphatic epoxides are the following:

FORMULA I

Diepoxides of cycloaliphatic esters of dicarboxylic acids having the formula:

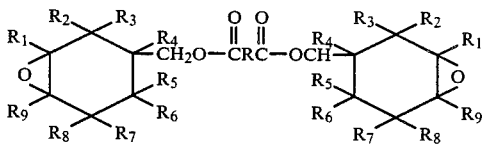

wherein $R_1$ through $R_9$, which can be the same or different are hydrogen or alkyl radicals generally containing one to nine carbon atoms inclusive and preferably containing one to three carbon atoms inclusive as for example methyl, ethyl, n-propyl n-butyl, n-hexyl, 2-ethylhexyl, n-octyl, n-nonyl and the like; R is a valence bond or a divalent hydrocarbon radical generally containing one to nine carbon atoms inclusive and preferably containing four to six carbon atoms inclusive, as for example, alkylene radicals, such as trimethylene, tetramethylene, pentamethylene, hexamethylene, 2-ethylhexamethylene, octamethylene, nonamethylene, and the like; cycloaliphatic radicals, such as 1,4-cyclohexane, 1,3-cyclohexane, 1,2-cyclohexane, and the like.

Particularly desirable epoxides, falling within the scope of Formula I, are those wherein $R_1$ through $R_9$ are hydrogen and R is alkylene containing four to six carbon atoms.

Among specific diepoxides of cycloaliphatic esters of dicarboxylic acids are the following:
bis(3,4-epoxycyclohexylmethyl)oxalate,
bis(3,4-epoxycyclohexylmethyl)adipate,
bis(3,4-epoxy-6-methylcyclohexylmethyl)adipate,
bis(3,4-epoxycyclohexylmethyl)pimelate,
and the like. Other suitable compounds are described in U.S. Pat. No. 2,750,395 to B. Phillips et al.

FORMULA II

A 3,4-epoxycyclohexylmethyl 3,4-epoxycyclohexane carboxylate having the formula:

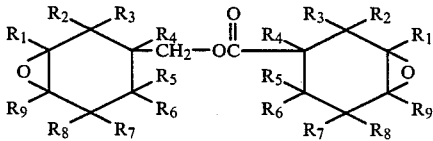

wherein $R_1$ through $R_9$ which can be the same or different are as defined for $R_1$ in formula I. Particularly desirable compounds are those wherein $R_1$ through $R_9$ are hydrogen.

Among specific compounds falling within the scope of Formula II are the following: 3,4-epoxycyclohexylmethyl, 3,4-epoxycyclohexanecarboxylate, 3,4-epoxy-1-methylcyclohexylmethyl, 3,4-epoxy-1-methylcyclohexylmethyl, 3,4-epoxy-1-methylcyclohexanecarboxylate, 6-methyl-3,4-epoxycyclohexylmethyl, 6-methyl-3,4-epoxycyclohexanecarboxylate, 3,4-epoxy-3-methylcyclohexylmethyl, 3,4-epoxy-3-methylcyclohexanecarboxylate, 3,4-epoxy-5-methylcyclochexylmethyl, 3,4-epoxy-5-methylcyclohexanecarboxylate. Other suitable compounds are described in U.S. Pat. No. 2,890,194 to B. Phillips et al.

FORMULA III

Diepoxides having the formula:

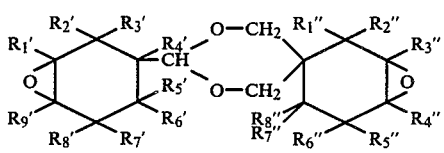

wherein the R single and double primes, which can be the same or different, are monovalent substituents such as hydrogen, halogen, i.e., chlorine, bromine, iodine or fluorine, or monovalent hydrocarbon radicals, or radicals as further defined in U.S. Pat. No. 3,318,822 to Hans Batzer et al. Particularly desirable compounds are those wherein all the R's are hydrogen.

Other suitable cycloaliphatic epoxides are the following:

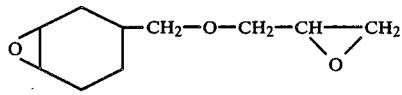

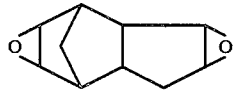

and the like.

The preferred cycloaliphatic epoxides are the following:

3,4-Epoxycyclohexylmethyl-3,4-Epoxycyclohexanecarboxylate

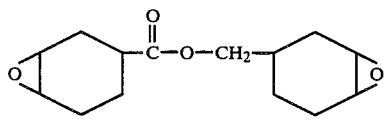

Bis-(3,4-Epoxycyclohexylmethyl) Adipate

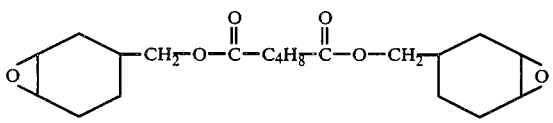

2-(3,4-Epoxycyclohexyl-5, 5,spiro-3,4-epoxy) cyclohexane-meta-dioxane

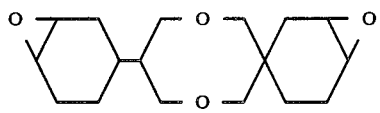

vinyl cyclohexane Dioxide

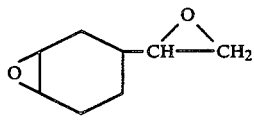

or mixtures thereof.

Epoxides with six membered ring structures may also be used, such as diglycidyl esters of phthalic acid, partially hydrogenated phthalic acid or fully hydrogenated phthalic acid. Diglycidyl esters of hexahydrophthalic acids being preferred.

Mixtures of epoxide resins may also be used.

The glycols suitable for use in this invention include polycaprolactone polyols as well as alkylene oxide adducts of polyhydroxyalkanes.

Illustrative of the polycaprolactone polyols that can be used one can mention the reaction products of a polyhydroxyl compound having from 2 to 6 hydroxyl groups with caprolactone. The manner in which these polycaprolactone polyol compositions are produced is shown in, for example, U.S. Pat. No. 3,169,945 and many such compositions are commercially available. In the following table there are listed illustrative polycaprolactone polyols. The first column lists the organic functional initiator that is reacted with caprolactone and the average molecular weight of the polycaprolactone polyol is shown in the second column.

Knowing the molecular weights of the initiator and of the polycaprolactone polyol one can readily determine the average number of molecules of caprolactone (CPL Units) that reacted to produce the compound; this figure is shown in the third column.

| | POLYCAPROLACTONE POLYOLS | | |
|---|---|---|---|
| | Initiator | Average MW of polyol | Average No. of CPL Units in molecules |
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalence glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,396 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 824 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis (hydroxyethyl)-benzene | 736 | 5 |

-continued

POLYCAPROLACTONE POLYOLS

| | Initiator | Average MW of polyol | Average No. of CPL Units in molecules |
|---|---|---|---|
| 27 | Glycerol | 548 | 4 |
| 28 | 1,2,6-Hexanetriol | 476 | 3 |
| 29 | Trimethylolpropane | 590 | 4 |
| 30 | Trimethylolpropane | 761 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

\* = Average molecular weight of glycol.

The structures of the compounds in the above tabulation are obvious to one skilled in the art based on the information given. The structure of compound No. 7 is:

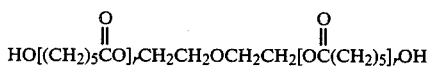

wherein the variable r is an integer, the sum of r+r has an average value of 3.7 and the average molecular weight is 527. The structure of compound No. 20 is:

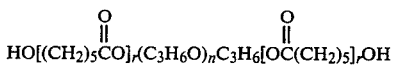

wherein the sum of r+r has an average value of 6 and the average molecular weight of 1,684. This explanation makes explicit the structural formulas of compounds 1 to 34 set forth above.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-1,5 - and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like; preferably the adducts of ethylene oxide, propylene oxide, epoxybutane, or mixtures thereof. A preferred class of alkylene oxide adducts of polyhydroxyalkanes are the ethylene oxide, propylene oxide, or mixtures thereof, adducts of trihydroxyalkanes.

The preferred alkylene oxide adducts of polyhydroxyalkanes are of the following formula:

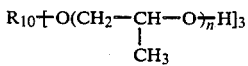

wherein $R_{10}$ is alkane of 3 to 10 carbon atoms, preferably 3 carbon atoms, and n is an integer of from about 4 to about 25.

It is customary to add appropriate hardeners to epoxide compositions to effect cure. Among suitable hardeners are the following: 1. polybasic acids having at least 2 carboxylic acid groups per molecule.

2. anhydrides of acids having at least 2 carboxylic acid groups per molecule.

Illustrative of suitable polybasic acids are the polycarboxylic acids of the formula:

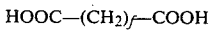

wherein f is an integer generally having a value of from 1 to 20 inclusive, as for example, malonic, glutaric, adipic, pimelic, suberic, azelaic, sebacic and the like. Other examples of suitable acids are phthalic acid, isophthalic acid, terephthalic acid, hexahydrophthalic acid, and the like. Further acids are enumerated in U.S. Pat. No. 2,918,444 to B. Phillips et al.

Among other suitable polybasic acids, having at least two carboxylic groups per molecule, can be noted the following: tricarballylic acid, trimellitic acid and the like. Other such suitable polybasic acids, including polyesters thereof, are described in U.S. Pat. No. 2,921,925 to B. Phillips et al.

Suitable anhydrides are the anhydrides of the acids listed above.

For purposes of stoichiometric calculations with respect to acids, one carboxyl group is deemed to react with one epoxy group; with respect to anhydrides, one anhydride group is deemed to react with one epoxy group.

Preferred hardeners include methyltetrahydrophthalic anhydride, hexahydrophthalic anhydride and methylhexahydrophthalic anhydride.

In an embodiment of this invention, the hardener such as the anhydride may be reacted with the glycol and this reacted product added to the epoxide.

It is to be understood that other additives can be added to the compositions of this invention as is well known in the epoxy art. These additives include the following: modifiers such as dimer acid (made from unsaturated $C_{18}$ fatty acids and is a mixture of 3 percent mono basic acids, 75 percent dimer acid and 22 percent trimer acid and sold under the name of Empol 1022 by Emery Industries), a carboxyl terminated butadiene acrylonitrile (80–20) random copolymer having a molecular weight of about 3300; fillers such as clay, silica, aluminum trihydride, or mixtures thereof which may be coated with, for example, silanes, which fillers may be added in amounts of up to about 60 percent; pigments such as carbon black; mold release agents, and the like.

The compositions of this invention are prepared by simply mixing the epoxide, glycol, catalyst, hardener and other ingredients at room or higher temperatures in a suitable container. Also, the epoxide and glycol may be mixed in one container and the hardener, catalyst and/or accelerator in another container and these two mixed.

The composition is then heated in order to effect its cure. The temperature to which the composition of this invention are heated to effect cure will, of course, vary and depend, in part upon the exact formulations of the composition. Generally, temperatures in the range of about 100° C. to about 200° C. are used for a period of time ranging from about 1 to about 6 hours.

The compositions of this invention are preferably used to fabricate thermoset resin articles by the procedure as set forth in U.S. patent application Ser. No. 430,366, filed in the names of R. Angell et al., titled "A Process For Fabricating Thermoset Resin Articles" and filed on the same data as this application. The process described in said application Ser. No. 430,366 comprises the steps of (a) providing in an accumulator zone, a liquid body of an epoxide containing organic material which is curable upon heating to a thermoset resin composition, the viscosity of said liquid body being maintained essentially constant in the accumulator zone by keeping its temperature below that at which curing of said materials is substantial, (b) providing a heated closed mold from which essentially all of the air has been removed from the cavity in said mold, (c) injecting at least a portion of said liquid body under pressure into the closed mold to fill the cavity in the mold, (d) initiating the curing of said materials by subjecting the materials to a temperature in the mold above the temperature at which the curing of said materials is initiated, (e) maintaining a pressure on the curing material, (f) injecting additional of said materials to the mold cavity during the curing of said materials, and (g) opening said mold and removing the article therefrom.

Other processes known in the art may be used to formulate the compositions of this invention.

EXAMPLES

The following Examples serve to give specific illustration of the practice of this invention but they are not intended in any way to act to limit the scope of this invention.

The following designations used in the Examples have the following meanings:

Epoxy 1 = 3,4-epoxycyclohexyl-3,4-epoxycyclohexane carboxylate
HHPA = hexahydrophthalic anhydride
ATH = aluminum trihydrate treated with a 1% by weight of a mixture of one part of beta(3,4-epoxycyclohexyl) ethyltrimethoxysilane and three parts of n-octyltriethoxysilane.
Polyol 1 = polycaprolactone polyol having a molecular weight of 1250.
Polyol 2 = polypropylene oxide triol having a molecular weight of 710.
Polyol 3 = polypropylene oxide triol having a molecular weight 5000.
Catalyst 1 = benzyl dimethyl amine.
Catalyst 2 = 2-methylimidazole.
Catalyst 3 = the reaction product of imidazole and propylene oxide.
Catalyst 4 = 2-phenyl-imidazole.
Catalyst 5 = 1-vinyl-2-methylimidazole.
Catalyst 6 = 1,4-diazobicyclo[2.2.2] octane.
Catalyst 7 = 1-methylimidazole.
Catalyst 8 = a mixture of 70 percent of bis(dimethylamino ethyl ether)and 30 percent dipropyleneglycol.
Catalyst 9 = bis(dimethylamino ethyl ether).
Catalyst 10 = n-propyl triphenyl phosphonium bromide.

PREPARATION OF FORMULATIONS

In preparation for incorporation into a formulation, the filler was dried for about 12 hours in an air oven at 100° C. The other ingredients were separately heated to 80° C. in an air oven for about 30 minutes just prior to use. When used, solid catalysts were dissolved by stirring them into the anhydride during the period the ingredients are heated to 80° C.

Liquid components of a formulation which were heated to 80° C. were rapidly mixed together by hand and the filler was rapidly stirred into the liquid composition. A timer was started to record pot-life data. The hand mixed composition (about 2 pounds total weight) was sheared on a Cowles Dissolver for 60 seconds and then placed in a large vacuum chamber. The pressure was reduced to about 30 inches of mercury (as read on a mechanical gauge) to de-aerate the mix. The vacuum was released as soon as the foam head which had formed collapsed, as seen through a viewpoint on the vacuum chamber. The time required for this procedure beginning with the starting of the time was about five minutes. The temperature of the formulation at this point was usually 80°±2° C.

One half of the mix was immediately poured into an aluminum cavity mold which was pre-heated to 150° C. (the mold cavity is 2 inches in diameter and 2½ inches deep, the walls are 1 inch thick). The mold was situated in a circulating air oven at 150° C. The temperature of the mold was monitored by a thermocouple placed mid-way in the mold wall. After filling the mold to within about ¼ inch to ½ inch from the top, an aluminum cap (at 150° C.) was placed over the mold. The cap held a thermocouple in its center which protruded to the center of the formulation (1 inch from the mold wall and bottom inside surfaces). A strip recorder was used to follow the exotherm profile. Immediately after filling the mold cavity, the other half of the formulation was poured into an 8 ounce metal can. The can was placed in a circulatory silicone oil bath at 80° C. A Brookfield viscometer (Model HAT, Spindle N. 4, 20 RPM) was used to follow the viscosity of the formulation with time. The first viscosity reading was routinely taken six minutes after the start of the time noted above.

Pot-life was measured by the time for the formulation to reach a specific viscosity at 80° C. (3000 centipoise and 20,000 centipoise). Cure speed was measured by the time from mold fill to peak exotherm in the 150° C. cavity mold. Peak exotherm temperature was also recorded.

CONTROL A AND EXAMPLES 1 TO 7

The ingredients in Table I were formulated as described in Preparation of Formulations, supra and tested as described above. The test results are shown in Table II.

TABLE I

| Example* | Control A | 1 | 2 | 3 | 4 | 5 | 6 | 7 |
|---|---|---|---|---|---|---|---|---|
| Epoxy I | 80 | 80 | 80 | 80 | 80 | 80 | 80 | 85 |
| Polyol I | 20 | 20 | 20 | 20 | 20 | 20 | 20 | 35 |
| HHPA | 70.4 | 70.4 | 70.4 | 70.4 | 70.4 | 70.4 | 70.4 | 73.33 |
| Catalyst | | | | | | | | |
| Type | Catalyst 1 | Catalyst 2 | Catalyst 2 | Catalyst 3 | Catalyst 4 | Catalyst 5 | Catalyst 6 | Catalyst 6 |
| Amount | 3.4 | 1.7 | 0.42 | 1.7 | 1.7 | 1.7 | 0.85 | 0.87 |
| ATH | 260.7 | 258.2 | 258.2 | 258.2 | 258 | 258 | 257 | 261.3 |

*All numbers represent parts by weight

TABLE II

| Example | Control A | 1 | 2 | 3 | 4 | 5 | 6 | 7 |
|---|---|---|---|---|---|---|---|---|
| Time for Viscosity to reach 3000 centipoise at | 75 | 36 | 62 | 32 | 100 | 47 | 34 | 57 |

TABLE II-continued

| Example | Control A | 1 | 2 | 3 | 4 | 5 | 6 | 7 |
|---|---|---|---|---|---|---|---|---|
| 80° C. (min) Gel time at 150° C. (min) | 9 | 5 | 6 | 4 | 9.5 | — | — | 42 |
| Time to peak Exotherm (min) | 15.5 | 10.0 | 8.4 | 8.8 | 10.3 | 7.3 | 8.7 | 9.0 |
| Peak Exotherm (°C.) | 188 | 210 | 200 | 207 | 208 | 206 | 187 | 189 |

EXAMPLES 8 to 12

The ingredients in Table III were formulated as described in Preparation of Formulations, supra, and tested as described above. The test results are shown in Table IV.

TABLE III

| Example* | 8 | 9 | 10 | 11 | 12 |
|---|---|---|---|---|---|
| Epoxy I | 80 | 80 | 80 | 80 | 80 |
| Polyol II | 10 | 10 | 10 | 10 | 10 |
| Polyol III | 10 | 10 | 10 | 10 | 10 |
| HHPA | 70.4 | 70.4 | 70.4 | 70.4 | 70.4 |
| Catalyst Type | Catalyst 6 | Catalyst 7 | Catalyst 8 | Catalyst 9 | Catalyst 10 |
| Amount | 0.85 | 0.43 | 1.7 | 1.7 | 0.85 |
| ATH** | 256 | 256 | 256 | 256 | 256 |

*All numbers represent parts by weight
**The ATH was untreated

TABLE IV

| Example | 8 | 9 | 10 | 11 | 12 |
|---|---|---|---|---|---|
| Time for viscosity to reach 20,000 centipoise at 80° C. (min) | 57 | 84 | 90 | 64 | 70 |
| Time to peak Exotherm (min) | 9.8 | 10.3 | 9.9 | 9.7 | 8.0 |
| Peak Exotherm (°C.) | 189 | 201 | 198 | 196 | 198 |

What is claimed is:

1. A curable molding composition comprising an epoxide resin, a polyol, a hardener, and a catalyst selected from the group consisting of amine, quaternary ammonium or phosphonium compounds which when combined, in an amount of from 0.5 to about 10 parts by weight per 100 parts by weight of resin, with said epoxide resin, said polyol, said hardener, and 60 percent by weight, based on the total weight of the formulation, of aluminum trihydrate produce a composition characterized by a peak exotherm of 210° C. or less, a time to peak exotherm of 10.5 or less minutes in a mold at 150° C., and a time for the viscosity of the composition to reach 3000 centipoise at 80° C. of 30 minutes or greater.

2. A curable composition as defined in claim 1 wherein the epoxide resin is a cycloaliphatic epoxide.

3. A curable composition as in claim 2 wherein the cycloaliphatic epoxide has the formula:

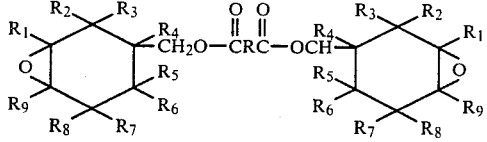

wherein $R_1$ through $R_9$, which are the same or different are hydrogen or alkyl radicals generally containing one to nine carbon atoms inclusive; R is a valence bond or a divalent hydrocarbon radical generally containing one to nine carbon atoms inclusive.

4. A curable composition as in claim 2 wherein the cycloaliphatic epoxide has the formula:

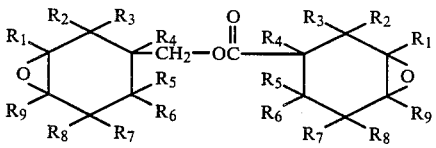

wherein $R_1$ through $R_9$ which are the same or different are hydrogen or alkyl radicals generally containing one to nine carbon atoms inclusive.

5. A curable composition as in claim 2 wherein the cycloaliphatic epoxide has the formula:

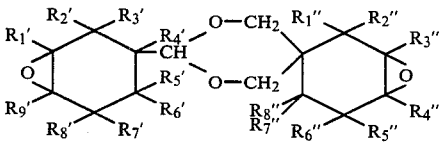

wherein the R groups are the same as different and are monovalent substituents or monovalent hydrocarbon radicals.

6. A curable composition as in claim 2 wherein the cycloaliphatic epoxide is 3,4-epoxycyclohexylmethyl-3,4-epoxy-cyclohexane carboxylate.

7. A curable composition as in claim 2 wherein the cycloaliphatic epoxide is bis(3,4-epoxycyclohexylmethyl)-adipate.

8. A curable composition as in claim 2 wherein the cycloaliphatic epoxide is 2-(3,4-epoxycyclohexyl-5,5-spiro-3,4-epoxy)cylohexane-meta dioxane.

9. A curable composition as in claim 1 wherein the polyol is a polycaprolactone polyol.

10. A curable composition as in claim 1 which contains a filler.

11. A curable composition as in claim 1 wherein the filler is selected from clay, silica, aluminum trihydrate, or mixtures thereof.

12. The composition of claim 1 wherein the catalyst is selected from the group consisting of pyridine-N-oxide, 1,4-diazabicyclo [2.2.2] octane, 2-methylimidazole, 2-phenyl-imidazole, 1vinyl-2-methyl imidazole, 1-acetyl imidazole, n-propyl triphenyl phosphonium bromide, benzyl triphenyl phosphonium bromide and chloride, n-heptyl triphenyl phosphonium bromide, ethyl triphenyl phosphonium bromide and iodide, n-hexyl triphenyl phosphonium bromide, and bis(dimethylaminoethyl) ether.

13. A curable composition as in claim 12 wherein the catalyst is 1,4-diazabicyclo [2.2.2]octane.

* * * * *